United States Patent [19]
Newton

[11] Patent Number: 5,727,996
[45] Date of Patent: Mar. 17, 1998

[54] APPARATUS FOR USE IN THE HUMANE SLAUGHTER OF ANIMALS

[75] Inventor: Reeve J. W. Newton, Birmingham, England

[73] Assignee: Accles & Shelvoke Limited, Birmingham, England

[21] Appl. No.: 767,380

[22] Filed: Dec. 16, 1996

[30] Foreign Application Priority Data

Dec. 16, 1995 [GB] United Kingdom ............... 9525772

[51] Int. Cl.⁶ ......................................... A22B 3/02
[52] U.S. Cl. ................................. 452/57; 452/62
[58] Field of Search ..................... 452/57, 61, 62, 452/58

[56] References Cited

U.S. PATENT DOCUMENTS

| | | | |
|---|---|---|---|
| 3,106,774 | 10/1963 | Gillman | 452/57 |
| 3,580,128 | 5/1971 | Leich | 86/31 |
| 3,714,896 | 2/1973 | Young | 102/41 |
| 4,640,182 | 2/1987 | De Haven et al. | 89/47 |
| 4,690,031 | 9/1987 | Metz et al. | 89/36.13 |
| 4,777,863 | 10/1988 | De Haven et al. | 89/33.1 |
| 5,221,809 | 6/1993 | Cuadros | 102/439 |
| 5,248,529 | 9/1993 | Hammond et al. | 427/558 |
| 5,306,200 | 4/1994 | Ripol et al. | 452/58 |

Primary Examiner—Willis Little
Attorney, Agent, or Firm—Cushman Darby & Cushman IP Group Pillsbury Madison & Sutro LLP

[57] ABSTRACT

A carousel arrangement for the automatic reloading of captive bolt stunners. The carousel includes stations for cartridge removal, bolt resetting and cartridge insertion. Further stations may incorporate safety checks or cooling devices.

9 Claims, 2 Drawing Sheets

APPARATUS FOR USE IN THE HUMANE SLAUGHTER OF ANIMALS

FIELD OF THE INVENTION

This invention relates to apparatus for use in the humane slaughtering of animals in abattoirs and the like.

BACKGROUND OF THE INVENTION

It is conventional practice to slaughter an animal by first stunning it using a suitable gun which projects a captive bolt at the animal. Conventionally such guns are fired by an explosive cartridge or by compressed gas.

It is frequently necessary, especially in large abattoirs, to deal with a large number of animals in a relatively short space of time. Thus a succession of animals may be conveyed or constrained to walk one at a time past the position at which a stun gun is being used. After each animal is stunned it is conveyed or allowed to slide down a suitable slope away from the stun position.

It is necessary, therefore, that the stun gun be reloaded after each use with a fresh cartridge if it is of the explosive cartridge type. Whereas the compressed gas type of gun does not require such reloading, it is generally accepted that such guns are less effective in stunning an animal and may require more than one attempt.

There is a need, therefore, to provide an apparatus by which stunning using a conventional explosive cartridge-type gun can be speeded up so as to satisfactorily deal with a large number of animals in quick succession.

SUMMARY OF THE INVENTION

Accordingly, the invention provides an automatic reloading machine for stunguns, the machine comprising a carousel having a plurality of spaced holders each to carry a gun, the carousel in one complete revolution passing through a plurality of stations including a first station at which a loaded gun is presented for use and further stations at which a used gun has its bolt reset, the used cartridge is removed and a new cartridge is inserted.

Preferably there are at least two other stations besides the first station where the loaded gun can be obtained. Thus at a second station the bolt of a used gun may be reset to its position ready for firing and the spent cartridge may be removed and at a third station a fresh cartridge is inserted into the breech of the gun.

More stations may be provided. For example there may be up to six stations with each station associated with a particular check or operation. One arrangement of stations could be as follows:

1. used gun loaded onto carousel;
2. used gun has bolt reset and spent cartridge removed;
3. sensor checks that gun chamber is empty;
4. fresh cartridge loaded into gun and gun scanned by sensor to check satisfactorily loaded;
5. the gun may be being cooled, sprayed or checked; and
6. loaded gun available for use.

Thus the operator takes a gun presented at station 6 and uses it. The empty holder at station 6 rotates to station 1 and the operator replaces the used gun back on its holder at station 1. A loaded gun from station 5 reaches station 6 and is available for use and so on.

The gun may be of the known two-part type, i.e. comprising a combined barrel and breech and a separate breech cap. In this arrangement the bolt is held captive in the barrel and the cartridge is housed in the breech. The breech cap, which includes the trigger is then screwed onto the end of the breech when the gun is ready to be used and is unscrewed after use so that the used cartridge can be removed and a fresh one inserted. In the present invention, therefore, the gun holders on the carousel may carry the combined barrel and breech gun parts and the operator retains the breach cap to screw onto the loaded gun he removes from the carousel. He then unscrews the breech cap after use and places the used gun without the breech cap back on the carousel.

Other sensors and indicators may be provided as desired. For example, there may be a "not loaded" indicator sensor between station 6 and station 1. Thus if a loaded gun is not removed at station 6, the mechanism may be controlled to stop the bolt resetting, cartridge removal and cartridge refilling steps as that unused gun continues around on the carousel. A sensor may be provided at station 4 to ensure that the spent cartridge has been satisfactorily removed before that gun is loaded with a fresh cartridge.

Other variants are, of course, possible. For example, station 3 could merely sense that the cartridge has been removed and station 4 could load a fresh cartridge and sense that loading was completed satisfactorily.

The loaded gun may be completely removable from the carousel for use or it may be withdrawn on a suitable arm or bracket.

Additional stations may be provided, as desired, on the machine, e.g. a station for spraying the gun with bacteriocide.

As a gun passes the relevant stations, the resetting of the bolt, the removal of the spent cartridge, the insertion of a fresh cartridge and any other desired operation can all be carried out automatically, e.g. by a series of mechanical arms or other means centrally controlled by a CPU programmed to respond to the various signals provided by the sensors around the machine. The drive mechanism for the carousel may be indexed to advance each holder one position each time a loaded gun is removed or a used gun is returned.

The carousel may pass through a cooling unit on the machine so that the guns, which will heat up rapidly with repeated use, can be cooled as they travel around the stations. For example, in the six station arrangement described above, the cooling unit could embrace stations 4, 5 and 6.

In another particularly preferred embodiment, the holders for the guns are arranged to swivel so that in the bolt resetting and spent cartridge removal station(s) the gun is horizontal. As the carousel takes the gun to the cartridge loading station the holder swivels to position the gun vertically so that the fresh cartridge can be loaded into the vertical gun from above.

A magazine of fresh cartridges can be positioned at the cartridge loading station with an indexing mechanism to load a single cartridge as each gun is brought to that station.

Spent cartridges extracted from the guns can be disposed of in any convenient manner, e.g. dropped via a chute to a storage bin to await removal.

The invention provides significant advantages over conventional methods of using a cartridge-type stun gun. The operator can increase the stun rate by more than 100% compared with a normal manual unload/reload operation and with less operator fatigue. Used cartridges are not left on the floor. The apparatus can conveniently incorporate cooling means so that gun overheating and consequential damage to gun parts can be avoided resulting in greater gun operating life. Also as indicated above, a sterilising unit can conveniently be incorporated in the apparatus so that improved hygiene may be obtained.

BRIEF DESCRIPTION OF THE DRAWINGS

Specific embodiments of the invention will now be described by way of example only with reference to the accompanying drawings, in which.

DESCRIPTION OF THE PREFERRED EMBODIMENTS

Figure 1:
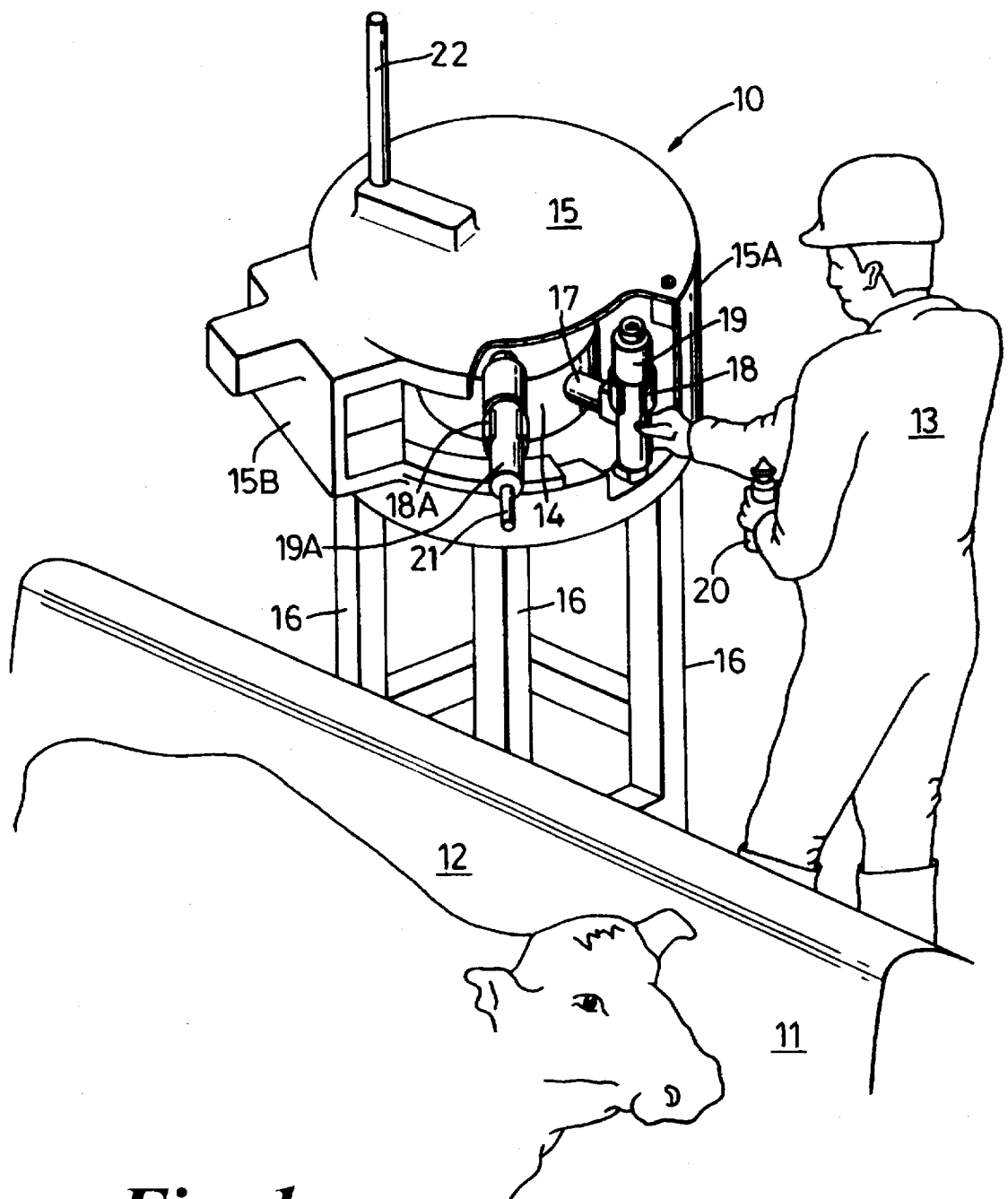
FIG. 1 is a representation of an apparatus of the invention in use in an abattoir.
Figure 2:
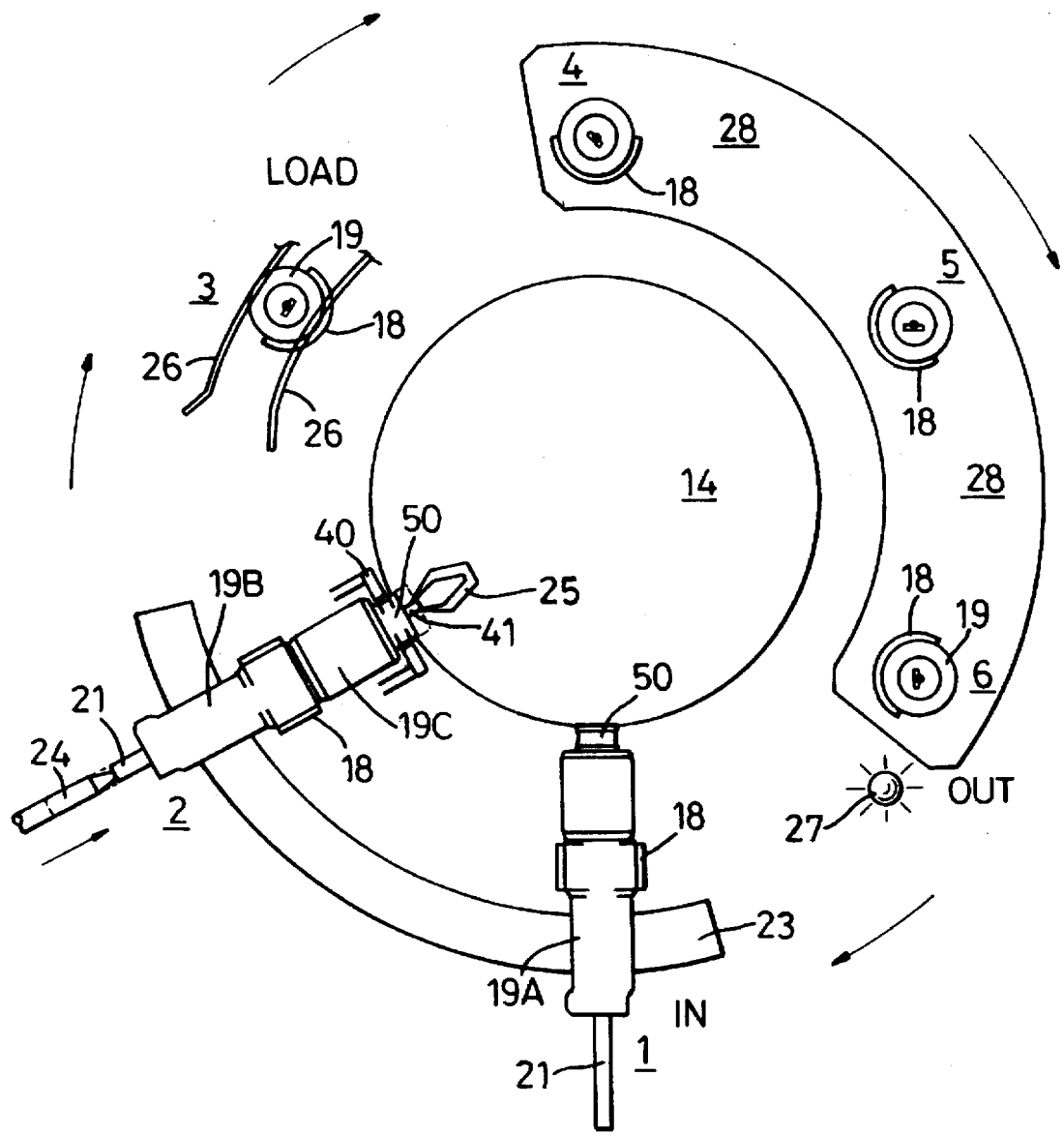
FIG. 2 is a diagrammatic plan view of the apparatus of FIG. 1.

In FIG. 1, an automatic reloading machine 10 is shown positioned adjacent a conveyor or animal walkway passage 11. An animal 12 to be stunned by operator 13 is shown on the conveyor adjacent the machine.

The machine has a carousel 14 mounted in a housing having a top cover 15 and sidewall 15A and is supported on legs 16.

The carousel has six equi-spaced arms 17 (one of which is shown in FIG. 1). Each arm ends in a swivelable bracket 18, thereby forming a holder for gun 19 (two of which are shown in FIG. 1).

The operator is shown removing a loaded gun 19, i.e. a loaded combined gun barrel and breech parts from the machine with one hand. In his other hand he holds a breech cap 20 which he will screw onto the loaded part 19 to form a complete gun ready for use. This loaded gun 19 is presented at an opening in side wall 15A.

Gun 19A has already been used—see its exposed captive bolt 21—and was replaced on the carousel by the operator before he removes the loaded part 19. As can be seen, the holder bracket 18A for the used gun is swivelling from the vertical position at which a loaded gun part is presented to a horizontal position. The housing sidewall contains an extension portion 15B to accommodate the length of the horizontal gun.

Protruding through the roof 15 of the housing is a magazine 22 which contains a number of cartridges for reloading used guns—see below.

The carousel 14 has six gun holders comprising pivotable brackets 18. It rotates within the machine which has six stations 1 to 6 as shown. At station 1 a used gun 19A has been rotated to a horizontal position and is supported on arcuate rail 23. At station 2 a rod 24 contacts bolt 21 of the still horizontal gun and presses it back into its barrel 19B. At the same station a lifting tool 40 is used to lift an extractor 50 and then return it to its original position on the gun 19. Whilst extractor 50 is in its lifted position the spent cartridge 41 can be removed by pulling tool 25.

At station 3 the gun 19 has been rotated back to the vertical position where it is carried on guide rails 26. A sensor, not shown, checks that the breech cover is empty, i.e. the cartridge has been correctly removed, and a cartridge is then loaded into the breech cover (from the magazine 22 shown in FIG. 1). This latter step may be carried out at station 4.

At station 4 a sensor (not shown) checks that the cartridge has been correctly loaded.

At station 5 the loaded gun is in transit to the unloading station 6 where it is presented to the operator.

Between station 6 and station 1 there is an indicator 27 which can inform the operator as to the loaded state of the machine.

From stations 4 to 6 the carousel passes through a cooling unit 28 to cool the used guns. Alternatively the whole machine may be cooled.

I claim:

1. An automatic reloading machine for stunguns, the machine comprising a carousel having a plurality of spaced holders each to carry a cartridge-operated gun and a pluarity of stations associated with the carousel so that the carousel in one complete revolution passes through said stations including a first station at which a sequentially loaded gun is presented for use and further stations at which a used gun has its bolt reset, the used cartridge is removed and a new cartridge is inserted.

2. An automatic reloading machine according to claim 1 including at least two other stations as well as the said first station.

3. An automatic reloading machine according to claim 1 or claim 2 in which the second station is adapted to reset the bolt of a used gun to its position ready for firing.

4. An automatic reloading machine according to claim 3 in which there is a third station at which a fresh cartridge is inserted into the breach of the gun.

5. An automatic reloading machine according to claim 1 including the following arrangement of stations:

(a) used gun loaded onto carousel;
(b) used gun has bolt reset and spent cartridge removed;
(c) sensor checks that gun chamber is empty;
(d) fresh cartridge loaded into gun and gun scanned by sensor to check satisfactorily loaded;
(e) the gun may be being cooled, sprayed or checked; and
(f) loaded gun available for use.

6. An automatic reloading machine according to claim 1 including a third station which said third station has means for sensing that a cartridge has been removed from a gun.

7. An automatic reloading machine according to claim 1 in which a cooling unit is provided which is adapted to cool guns as they travel around the carousel.

8. An automatic reloading machine according to claim 1 in which holders are provided for the guns in the carousel and such holders are arranged to swivel so in the bolt resetting and spent cartridge removal operations the gun is already in a horizontal position.

9. An automatic reloading machine according to claim 8 in which the holder is adapted to swivel so as to position the gun vertically before a fresh cartridge is loaded into the then-vertical gun from above.

* * * * *